(12) United States Patent
Reyhanloo et al.

(10) Patent No.: US 9,826,858 B2
(45) Date of Patent: Nov. 28, 2017

(54) HOT FLUID PREPARATION UNIT FOR A FULLY AUTOMATIC COFFEE MACHINE

(71) Applicant: JURA Elektroapparate AG, Niederbuchsiten (CH)

(72) Inventors: Shahryar Reyhanloo, Immensee (CH); Ted Kao, Penang (MY)

(73) Assignee: Jura Elektroapparate AG, Niederbuchsiten (CH)

( * ) Notice: Subject to any disclaimer, the term of this patent is extended or adjusted under 35 U.S.C. 154(b) by 351 days.

(21) Appl. No.: 14/636,555

(22) Filed: Mar. 3, 2015

(65) Prior Publication Data

US 2015/0250355 A1   Sep. 10, 2015

(30) Foreign Application Priority Data

Mar. 4, 2014   (EP) ..................................... 14405019

(51) Int. Cl.
*A47J 31/56*   (2006.01)
*A47J 31/54*   (2006.01)

(52) U.S. Cl.
CPC ............... *A47J 31/56* (2013.01); *A47J 31/54* (2013.01); *A47J 31/545* (2013.01)

(58) Field of Classification Search
CPC .. H05H 1/0244; H05H 1/0269; H05H 3/0052; H05H 3/009; H05H 2203/021; H05B 1/0244; H05B 1/0269; H05B 3/0052; H05B 3/009; A47J 31/56; A47J 31/545; A47J 31/54

USPC ................................. 219/492, 501, 494, 497
See application file for complete search history.

(56) References Cited

U.S. PATENT DOCUMENTS

2004/0211769 A1* 10/2004 Merk ..................... H05B 3/342
219/494
2006/0226141 A1* 10/2006 Suenaga ................ H05B 6/666
219/501

FOREIGN PATENT DOCUMENTS

EP   2 423 619 A2   2/2012

* cited by examiner

*Primary Examiner* — Christopher Kim
(74) *Attorney, Agent, or Firm* — Alston & Bird LLP (57) ABSTRACT

A hot fluid preparation unit for a fully automatic coffee machine is specified. With the goal of reducing the heating-up time of a fluid, the solution according to the invention provides that the hot fluid preparation unit has a temperature control device, a fluid heating arrangement, a rectifier circuit and a power semiconductor switching device. The rectifier circuit is connected at an input of the rectifier circuit to an AC voltage supply and at an output of the rectifier circuit, via the power semiconductor switching device, to the fluid heating arrangement. The power semiconductor switching device is designed in a controllable manner such that it selectively switches through the output of the rectifier circuit to the fluid heating arrangement. The temperature control device is configured to control the power semiconductor switching device in a pulsed manner, in order thus to perform a temperature adjustment.

15 Claims, 6 Drawing Sheets

Prior Art

HOT FLUID PREPARATION UNIT FOR A FULLY AUTOMATIC COFFEE MACHINE

CROSS-REFERENCE TO RELATED APPLICATIONS

This application claims priority to European Patent Application No. EP 14405019.2 filed on Mar. 4, 2014, the contents of which are incorporated herein by reference.

FIELD OF THE INVENTION

The present invention relates to a hot fluid preparation unit for a fully automatic coffee machine, a method for operating a fully automatic coffee machine with a hot fluid preparation unit, and the use of a hot fluid preparation unit in a fully automatic coffee machine.

BACKGROUND

A fully automatic coffee machine designates devices for obtaining hot beverages, in which at the initiation of an operator a coffee beverage is automatically prepared and dispensed in a sequentially controlled manner. As a rule such fully automatic coffee machines are equipped with a drinking water supply in the form of a water container or a drinking water supply connection, a grinder unit for grinding coffee beans, a brewing unit for preparing the hot beverage from the ground coffee beans and the hot water, and a hot beverage dispensing device in the form of a nozzle or similar. In order to enable different types of coffee drinks to be dispensed, in particular to allow the user to heat up and/or froth up milk with the aid of the fully automatic coffee machine, conventional fully automatic coffee machines are known which additionally enable a fully automatically controlled or also manually controlled dispensation of steam at a steam output nozzle or the like. In order to save components and thereby material, it is usual to equip such a fully automatic coffee machine with only one primary heating arrangement in the form of a continuous-flow water heater. This single continuous-flow water heater serves—under appropriate control by a machine control circuit that is often present—both to prepare hot water for the coffee brewing process (in the range around 100° C.) and to prepare useful steam for output at the steam dispensing nozzle, wherein for this purpose it must heat up the supplied drinking water to temperatures of approximately 160° C. to transfer it into the gaseous condition.

Figure 2:
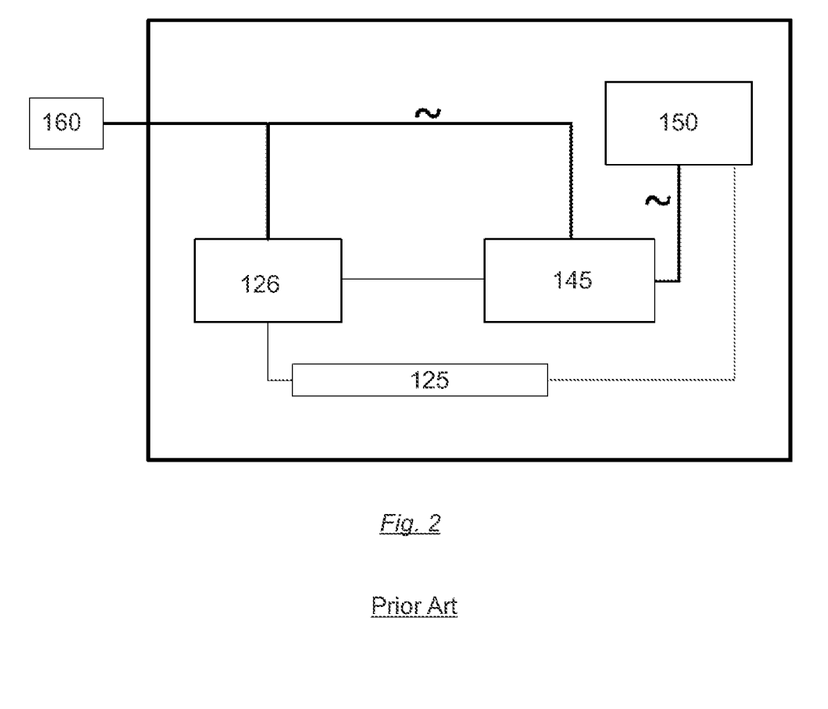
FIG. 2: shows a block diagram of a hot fluid preparation unit known from the prior art.

In the case of conventional fully automatic coffee machines that in order to provide the control of the continuous-flow water heater based on demand, it is known to connect a controllable circuit element between the AC voltage supply and the continuous-flow water heater. FIG. 2 shows such a conventional circuit design schematically in the form of a block diagram. An AC voltage (as a rule typical mains AC voltage of 230 V and 50 Hz) fed by an external AC voltage supply 160 is applied to the one power connection of a Triac 145; at the output side the Triac is connected to a fluid heating arrangement, here in the form of a thermoblock 150. To control the Triac, a microcontroller 126 is provided which drives the Triac in accordance with the signal of a fluid temperature sensor 125 that measures the temperature of the fluid at the output of the thermoblock 150. In the conventional control electronics this type of control is only possible in a manner whereby the Triac 145 switches the full AC voltage through to the thermoblock 150 or not over a period from several seconds up to a few minutes.

Conventional fully automatic coffee machines typically consume a power of around 1.4 kW. When the fully automatic coffee machine is turned on for the first time, i.e. directly after being placed into operation, a heating process then takes place by appropriate control using the microcontroller 126, in order to heat up the fluid at the thermoblock to its working temperature, i.e. approximately 100° C. If steam is then to be dispensed, the fluid supplied must be heated up from 100° C. to approximately 160° C. During such a heating-up period $T_H$, which is shown schematically in the diagrams of FIGS. 3a, 3b and 3c, the microcontroller 126 drives the Triac 145 continuously in such a manner that it switches the AC voltage from the AC voltage supply 160 through to the thermoblock 150, until the feedback signal from the temperature sensor 125 indicates that the target temperature of, for example, 160° C. has been reached or exceeded. During the subsequent dispensation of steam, the thermoblock 150 is then turned off at intervals or turned on again temporarily for short temporary intervals $T_Z$ of a few seconds, in order to maintain the target temperature for the useful steam of approximately 160° C.

Figure 3A:
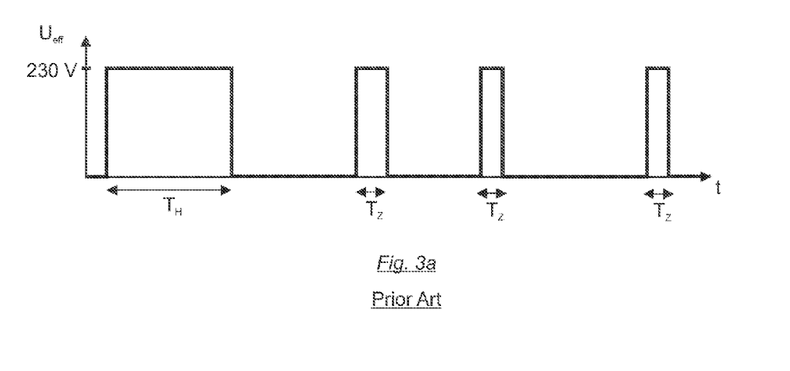
FIGS. 3a-3c: show time curves of the effective voltage (FIG. 3a), the fluid temperature (FIG. 3b) as well as the thermal power (FIG. 3c) of a fluid heating arrangement in a hot fluid preparation unit known from the prior art in accordance with FIG. 2.
Figure 3B:
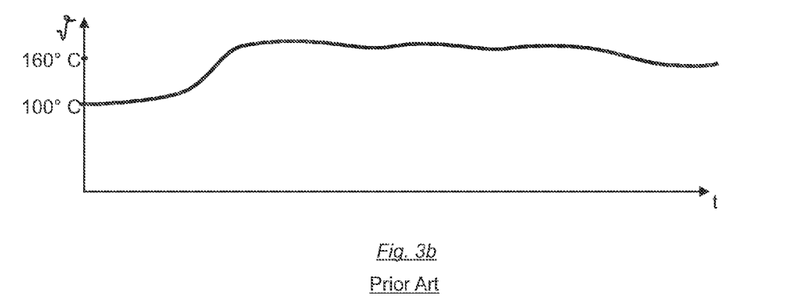
Figure 3C:
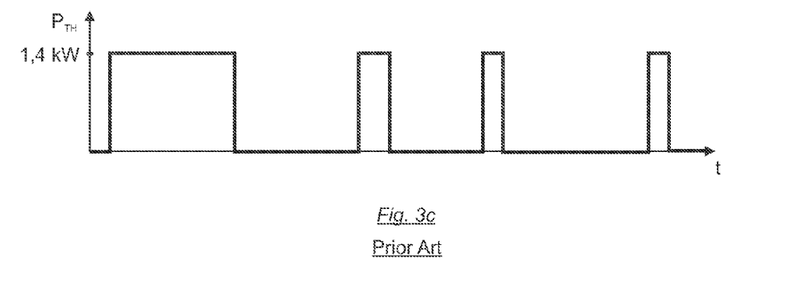

The thermal power $P_{TH}$ (in fact pure effective power due to the almost completely resistive consumer) shown in FIG. 3c follows in this case the effective voltage $U_{eff}$ at the output of the Triac 145, shown in FIG. 3a. A curve of the fluid temperature θ is then obtained, as is shown in FIG. 3b, for example.

Conventional hot fluid preparation units of this type then have the disadvantage that the time taken for the initial heating, i.e. the period $T_H$ is relatively long, for example longer than 5 seconds. If steam dispensation is desired, the system must wait for the entire period $T_H$, which reduces the operational convenience and the maximal quantity of coffee that can be prepared per unit time.

SUMMARY OF VARIOUS EMBODIMENTS

It is the object of the present invention therefore to further develop a hot fluid preparation unit for a fully automatic coffee machine such that the warming up time is reduced. With regard to the method according to the invention, an object of the present invention is to specify a method for operating a fully automatic coffee machine, in which the waiting time to dispense a coffee is shortened.

The object of the invention is achieved by a hot fluid preparation unit for a fully automatic coffee machine with the features of independent claim 1 and by a method for operating a fully automatic coffee machine with the features of independent claim 8.

It is provided there that the hot fluid preparation unit for a fully automatic coffee machine in accordance with the present invention comprises the following:
  a temperature control device;
  a fluid heating arrangement;
  a rectifier circuit; and
  a power semiconductor switching device,
  wherein the rectifier circuit is connected at an input of the rectifier circuit to an AC voltage supply and at an output of the rectifier circuit via the (intermediately arranged) power semiconductor switching device to the fluid heating arrangement, wherein the power semiconductor switching device is designed to be controllable in such a manner that it selectively switches the output of the rectifier circuit through to the fluid heating arrangement, and wherein the temperature control device is designed to carry out a control of the power semiconductor switching device in a pulsed manner, in order thus to provide temperature control.

In other words, with the aid of the control electronics, i.e. with the aid of the temperature control device, there is now no Triac to control; rather a rectification of the AC mains voltage supplied by the AC voltage supply takes place. The rectified AC mains voltage (DC voltage) is then switched by means of a power semiconductor element, i.e. by means of a power semiconductor switching device after appropriate control by the temperature control device. The power semiconductor switching device is in this case a semiconductor component with which very high powers can also be switched in the direct current domain. By means of the appropriate control the DC voltage can therefore be selectively applied to the fluid heating arrangement. A particular advantage that is obtained in accordance with the invention is that a particularly high-performance fluid heating arrangement can now be used, for example with a power consumption of 2.8 kW. As a result of the control provided by means of the temperature control device and the power semiconductor switching device, which can take place very rapidly, a good control behaviour is obtained even if the fluid heating arrangement has a high rated power, and therefore no overheating of the fluid occurs. Due to this, the warming up time to heat up the fluid from the brewing temperature (water temperature approximately 100° C.) to useful steam temperature (steam temperature of approximately 160° C.) is significantly shortened, for example now to as little as 2.5 to 3 seconds.

In accordance with one aspect of the invention, it is provided that the temperature control device is designed to vary the ratio of the pulse duration to the interval duration of pulses provided for the control of the power semiconductor switching device during the pulse-controlled operation of the power semiconductor switching device. This results in the particular advantage that, by means of this type of control, the fluid heating arrangement can be operated with any desired power between 0 Watt and the rated output power, i.e. for example 2.8 kW. In particular when only a single fluid heating arrangement is provided both for preparing water for brewing in the region of approximately 100° C., and also for preparing useful steam, this fluid heating arrangement can be operated, in the normal case—i.e. for preparing water for brewing—at the known conventional rated power of approximately 1.4 kW. If a product containing steam (cappuccino, latte macchiato etc.) is to be dispensed from the fully automatic coffee machine however, and as quickly as possible, then after the appropriate selection by the operator the fluid must be heated up to a higher temperature relatively quickly. In this case, the power output of the fluid heating arrangement can then be controlled by the corresponding variation of the control of pulse duration and interval duration, in such a manner that the fluid heating arrangement is operated at its full rated output of, for example, 2.8 kW. This sharply reduces the heating-up period.

In accordance with a further aspect of the invention, it is provided that the fluid heating arrangement is designed, in accordance with the control of the power semiconductor switching device, to heat up the drinking water supplied at the input to a water temperature suitable for carrying out a coffee brewing process, or to heat up drinking water supplied at the input to a useful steam temperature, and in each case to provide it at the output.

This results in the particular advantage that, due to its variable control, one and the same fluid heating arrangement can be used both to prepare water for brewing and also to prepare useful steam. A corresponding control operation can be applied in response to a signal input by an operator, for example pressing a selection key or the like.

In accordance with a further aspect of the invention, the fluid heating arrangement can be designed to vary the ratio of pulse duration to pulse interval in the heating of the supplied drinking water, in order to bring about a variation in the thermal power of the fluid heating arrangement. In this manner it is advantageously possible during the heating of the drinking water (e.g. during a brewing process to brew coffee), to vary the thermal power of the fluid heating arrangement in a substantially continuous manner (in accordance with the ratio of pulse duration to pulse interval), wherein the instantaneous thermal power is greater, the smaller the pulse interval duration in comparison to the pulse duration.

In accordance with a further aspect of the invention, it is provided that the fluid heating arrangement is a thermoblock with a rated output power ≥2 kW, preferably of approximately 2.8 kW. A thermoblock with such a rated output level enables it particularly well to significantly shorten the heating-up period in particular for heating-up water from a brewing water temperature (approximately 100° C.) to a useful steam temperature (approximately 160° C.); for an initial heating process however, this is also advantageous if, for example, directly after being switched on the desired brewing water temperature is to be reached as quickly as possible.

In accordance with a further aspect of the invention, it is provided that the temperature control device is designed to adjust the ratio of pulse duration to pulse interval such that the fluid heating arrangement is operated in a medium power range, preferably approximately 1.4 kW if the target fluid temperature is about 100° C., and that the temperature control device is then configured to adjust the ratio of pulse duration to pulse interval such that the fluid heating arrangement is operated in its rated power range, preferably approximately 2.8 kW, if the target fluid temperature lies in the steam range, advantageously in the region of approximately 160° C.

The temperature in the steam range in this context is related to the rated pressure of the fully automatic coffee machine, or to standard atmospheric pressure (ambient pressure). This particular configuration results in the advantage that, for a target fluid temperature specified for example by the machine controller for preparing a hot beverage (approx. 100° C. brewing water temperature), the fluid heating arrangement can be operated in a medium power range, which leads to a less severe overshooting behaviour of the actual fluid temperature at the output of the fluid heating arrangement than when the fluid heating arrangement is also operated for dispensing brewing water at its full rated power output of, for example, 2.8 kW. If a steam dispensing process is then required to take place, for example to prepare a hot beverage product with a steamed component, then in this case (target fluid temperature in the steam range of approx. 160° C.) the fluid heating arrangement is operated at its rated power range in order to reduce the heating-up period.

In accordance with a further aspect of the invention, it is provided that the hot fluid preparation unit additionally comprises a temperature sensor for sensing the fluid temperature in the fluid heating arrangement or at its output. In this case the temperature control device is configured to vary the ratio of pulse duration to pulse interval such that a target fluid temperature which is or can be specified in advance is attained at the output of the fluid heating arrangement.

This allows a particularly accurate regulation of the desired temperature, which in turn facilitates the brewing water temperature for a coffee brewing process to be optimally adjusted, and if steam dispensation is desired, the temperature for the steamed component (useful steam temperature) also to be optimally adjusted.

In accordance with a further aspect of the invention, the power semiconductor switching device is implemented as a MOSFET, preferably as a power MOSFET. It should be noted here that other designs are also possible in principle, for example IGBTs or the like. The implementation as a power MOSFET in this context has the particular advantage that low losses occur in the settled (conducting) state, while at the same time maintaining low switching losses (transient losses).

In relation to the method according to the invention, the object is achieved by the fact that the method for operating a fully automatic coffee machine is provided, wherein the fully automatic coffee machine for preparing a hot fluid comprises at least one hot fluid preparation unit, which in turn comprises the following:
  a temperature control device;
  a fluid heating arrangement;
  a rectifier circuit; and
  a power semiconductor switching device,
wherein the rectifier circuit is connected at an input of the rectifier circuit to an AC voltage supply and at the output side via the (intermediately arranged) power semiconductor switching device to the fluid heating arrangement, wherein the power semiconductor switching device is designed to be controllable in such a manner that it selectively switches the output of the rectifier circuit through to the fluid heating arrangement, and wherein the temperature control device is designed to carry out a control of the power semiconductor switching device in a pulsed manner.

The particular advantage of the method according to the invention consists in the fact that the fluid heating arrangement can be operated at different thermal powers, namely in accordance with an input variable in the form of a parameter. This parameter is process related such that when, as requested (for example on instruction by the machine controller of the fully automatic coffee machine), the heating-up period of the fluid is to be shortened, the fluid heating arrangement can be operated at its full rated power. If on the other hand the parameter indicates, as required by the process, that only a lower thermal power is necessary, then a lower thermal power can also be requested by the variation of the ratio of pulse duration to pulse interval of the controller of the power semiconductor switching device in accordance with the method according to the invention, in order to obtain, for example, a more favourable overshoot behaviour of the actual fluid temperature delivered at the output of the fluid heating arrangement.

In accordance with one aspect of the invention, it is provided that in the method the process related parameter indicates whether hot water or steam is to be dispensed. Alternatively or in addition, the process related parameter indicates at which temperature the hot water or the steam is to be dispensed.

This results in the particular advantage that in accordance with the parameter, the power (thermal power) of the fluid heating arrangement can be selected, so that when useful steam is to be prepared particularly rapidly, the fluid heating arrangement is operated at its rated power; if however, hot water for brewing is to be dispensed at a brewing water temperature that must be adjusted relatively precisely, then by the appropriate specification of the process related parameter in the method according to the invention, the fluid heating arrangement is operated at a thermal power which is lower than its rated power in order thereby to positively influence the overshoot behaviour of the fluid temperature and to dispense the fluid as accurately as possible at its target temperature.

In accordance with a further aspect of the invention, the method comprises a method step in which the ratio of pulse duration to pulse interval is modified when hot water or steam is being dispensed. In this manner the thermal power of the fluid heating arrangement can be varied in accordance with the ratio of pulse duration to pulse interval in a substantially continuous manner, e.g. while the fluid heating arrangement is providing steam or hot water for brewing coffee. At the same time the instantaneous thermal power of the fluid heating arrangement is larger, the smaller is the pulse interval in comparison with the pulse duration.

In accordance with a further aspect of the invention, the method comprises the method step according to which the fluid temperature that is to be provided at the output of the fluid heating arrangement is determined, and wherein the process-related parameter indicates whether or not the fluid temperature falls below a process-related target fluid temperature for the hot beverage preparation to be carried out by more than a specified or specifiable value.

This means that it is not only for heating up from the stand-by temperature (approx. 100° C. brewing water temperature) to the useful steam temperature (approx. 160° C. steam temperature) that the heating period can be shortened; rather that after the temperature has been lowered (e.g. to implement an energy-saving function between coffee deliveries), the time taken to reach the coffee standby state again (brewing water temperature then again at 100° C.) is also shortened. In other words: whenever a particularly rapid heating is required, because the target fluid temperature (for brewing water or for steam respectively) lies far above the actual instantaneous fluid temperature, by operating the fluid heating arrangement at its rated power, the waiting time is considerably shortened. In the case of a smaller difference between target fluid temperature and the actual fluid temperature, the ratio of pulse duration to pulse interval is then varied in such a manner that, to be sure, a still relatively rapid heating takes place; by operating the fluid heating arrangement at a power which is less than the rated power however, a better overshoot behaviour can then be ensured, so that, for example, the brewing temperature of 100° C. (optimal brewing temperature) is not unnecessarily exceeded even at the start of the brewing processes.

In accordance with a further aspect of the invention, it is provided that the temperature control device controls the fluid heating arrangement during a standby period of the fully automatic coffee machine in such a manner that its thermal power remains at zero throughout. In other words: during the standby period between two successive coffee deliveries, no heating process occurs by means of the fluid heating arrangement. In the solution according to the invention this is not necessary, since at the beginning of a subsequent coffee delivery the attainment of the necessary fluid temperature takes place very quickly by means of the appropriate control operation, and therefore only a minimal or no waiting time occurs at all. This means that a considerable energy saving is possible during longer standby intervals between the dispensations of the product, because the heating can then be completely turned off. The temperature at the output of the fluid heating arrangement therefore no longer needs to be constantly kept at a standby temperature, which has a positive effect on the energy balance, particularly when no product is dispensed over a fairly long period in which the fluid can cool off.

In accordance with a further aspect of the solution according to the invention, a hot fluid preparation unit as mentioned above is used in a fully automatic coffee machine. In this case the fully automatic coffee machine comprises a flow control arrangement for controlling an automatic or semi-automatic hot beverage preparation process. The flow control arrangement assumes the task of specifying the target fluid temperature for the temperature control device in accordance with the temporal sequence of the hot beverage preparation processes.

This results in the particular advantage that independently of an operator, control of the thermal power of the fluid heating arrangement can take place fully automatically during a hot beverage preparation process by means of the flow control arrangement of the fully automatic coffee machine. This is advantageous in the case of combined products with steam and brewing water ingredients in particular, because such an automatic control means that the waiting period between individual heating processes can be further shortened.

When used according to the invention, it is again provided that during a standby period of the fully automatic coffee machine the temperature control device controls the fluid heating arrangement in such a manner that its thermal power remains at zero throughout.

This again results in the particular advantage that in longer standby intervals between dispensation of the product heating is no longer needed, so that even in the event of a cooling of the thermoblock this can be heated up again particularly quickly to its target temperature for dispensing the selected product. In the intervening period, energy can be saved.

BRIEF DESCRIPTION OF THE SEVERAL VIEWS OF THE DRAWINGS

The invention is described in more detail hereafter by reference to the attached drawings. In the figures.

DETAILED DESCRIPTION

Figure 1:
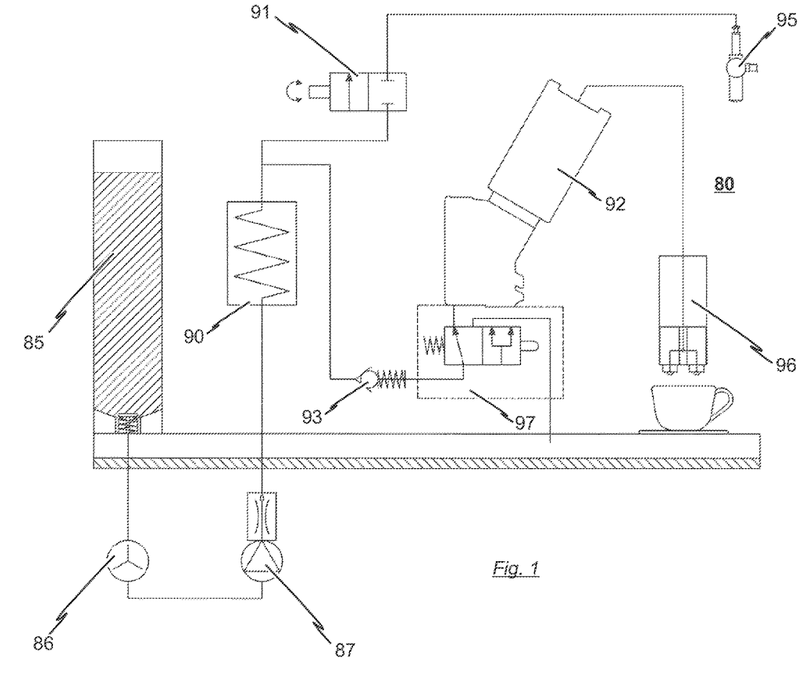
FIG. 1: shows the schematic construction of a fully automatic coffee machine.

FIG. 1 shows a schematic of the construction of a fully automatic coffee machine 80. A water tank 85 serves to supply fresh water to a continuous-flow water heater 90, the two being connected via a flow meter 86 for measuring the water quantity throughput and a pump 87 for pumping the fresh water. The continuous-flow water heater 90 serves in the present case as a hot fluid preparation unit with corresponding control facility and is connected to a machine flow controller (not shown) of the fully automatic coffee machine. At its output side, a changeover valve 91 is provided on the continuous-flow water heater 90, which enables the supply of the output of the continuous-flow water heater 90 to be switched to a foaming device 95 (operated with steam) or to a brewing unit 92 (operated with hot brewing water). At the input side, the brewing unit 92 is fitted with a non-return valve 93 and a drainage valve 97. At the output side of the brewing unit 92, the coffee beverage prepared in the brewing unit 92 is passed to a coffee delivery device 96, which dispenses the prepared coffee beverage, for example into a beverage container (cup), as shown in FIG. 1.

Figure 5:
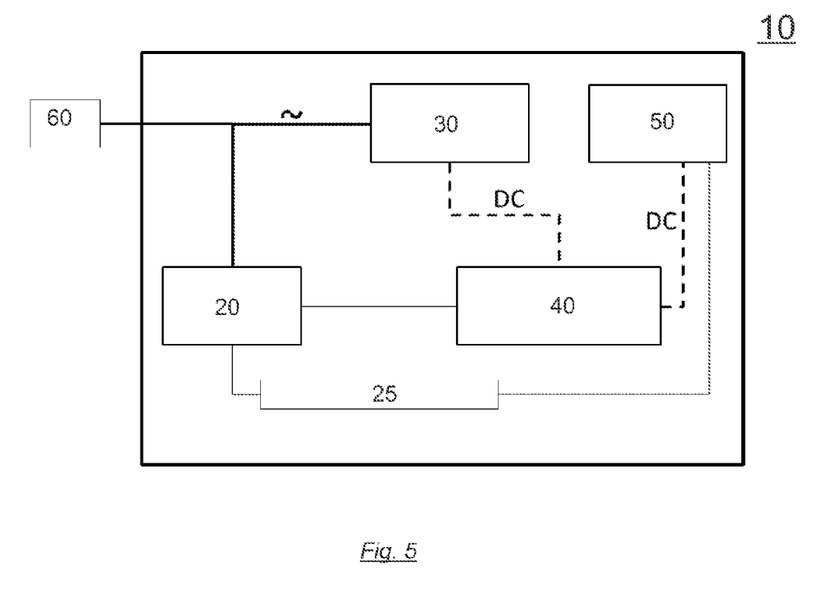
FIG. 5: shows a schematic block diagram of a hot fluid preparation unit according to the invention in accordance with one embodiment of the present invention.

In the block circuit diagram shown in FIG. 5 the hot fluid preparation unit 10 arranged in the continuous-flow water heater 90 of the fully automatic coffee machine 80 has in accordance with the embodiment of the invention an AC voltage supply 60, which usually corresponds to a mains voltage connection (230 V, 50 Hz). This mains AC voltage (provided by the AC voltage supply 60) is then fed to a temperature control device 20; at the same time it is fed to a rectifier circuit 30 which delivers a rectified mains voltage at its output at its effective value (approximately 325 V DC) to a power semiconductor switching device 40 in the form of a power MOSFET. The power semiconductor switching device 40 is controlled by means of the temperature control device 20 via an interface connection. At the output side the power semiconductor switching device 40 is connected to a fluid heating arrangement 50 in the form of a thermoblock, which provides the actual continuous heating function of the continuous-flow water heater 90.

Figure 6A:
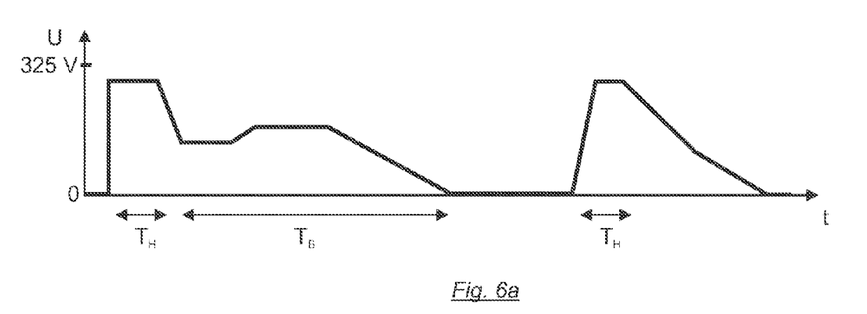
FIGS. 6a-6c: show diagrams showing time curves of the effective value of the voltage (FIG. 6a), the fluid temperature (FIG. 6b) and the effective power (FIG. 6c) of the hot fluid preparation unit according to the invention from FIG. 5.
Figure 6B:
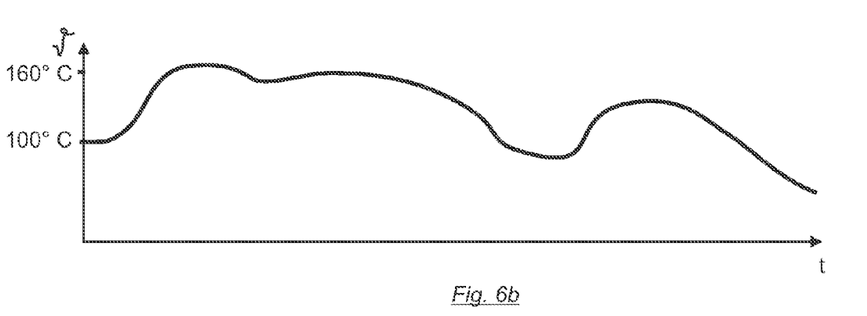
Figure 6C:
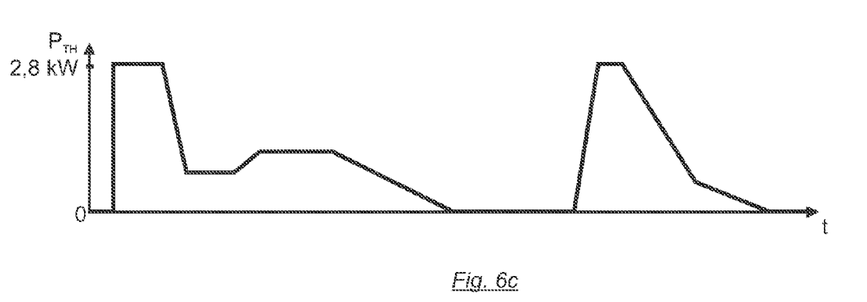

FIG. 6a shows the plot of the DC voltage when the power semiconductor switching device 40 is controlled according to the invention by means of the temperature control device 20. As is evident from FIG. 5, a temperature sensor 25, which is connected to the fluid heat arrangement 50 and which measures the fluid temperature θ in the fluid heating arrangement 50 or at its output, serves to feed back a measurement parameter (here: the temperature) to the temperature control device 20. During a heating-up period $T_H$, as is evident from FIG. 6a, the voltage applied at the input of the fluid heating arrangement 50 is first of all fully transmitted by means of the power semiconductor switching device 40, so that—as shown in FIG. 6b—the fluid temperature θ rises relatively quickly (<5 seconds) from approximately 100° C. to the useful steam temperature of 160° C. for dispensing steam from its brewing water. The associated curve of the thermal power $P_{Th}$ is shown in FIG. 6c. As can be seen, during the heating-up period $T_H$ the thermal power $P_{Th}$ is at its maximum of 2.8 kW.

After the end of the heating-up period, the voltage and therefore the thermal power is reduced; for the sake of simplicity it is not the actually applied pulsed DC voltage that is shown in FIG. 6a, but rather the voltage curve of the effective DC voltage at a passive consumer. Nevertheless it becomes clear that after coffee has been dispensed, the voltage and therefore the thermal power is held at a medium value for a short standby period $T_B$, in order then to be reduced to zero toward the end of the standby period $T_B$, in order to save energy. In this period, the fluid temperature θ then also drops and falls to a value below the brewing water temperature of 100° C. At the beginning of a new coffee delivery, in a subsequent heating period $T_H$ the voltage is again brought to its full value of approx. 325 V, which means that the effective power for this period again corresponds to the rated power of 2.8 kW. During this period, the fluid temperature θ increases relatively quickly in turn, which means the heating-up period $T_H$ can be shortened and therefore the waiting time can be reduced.

Figure 4:
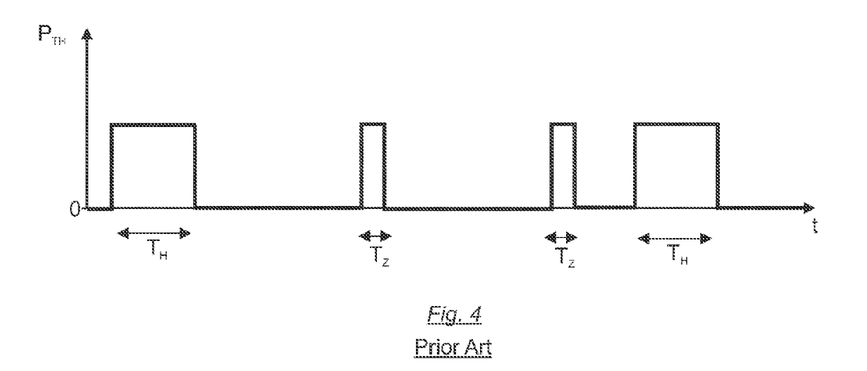
FIG. 4: shows in a simplified schematic view, the plot of the effective power curve over time in the hot fluid preparation unit known from the prior art in accordance with FIG. 3c.
Figure 7:
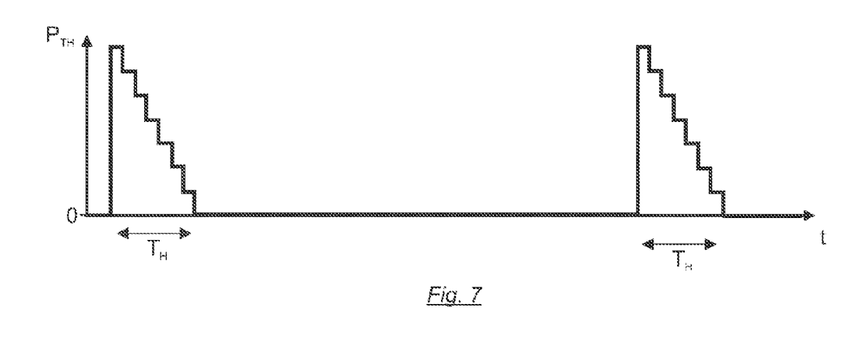
FIG. 7: shows a schematic plot of the thermal power as a function of time in accordance with FIG. 6c in comparison to the thermal power curve as a function of time in accordance with FIG. 4.

As is evident from the schematic comparison of the respective time curves of the effective powers (the conventional solution in accordance with the prior art is shown in FIG. 4; the solution according to the invention is shown in FIG. 7), in accordance with the invention it is no longer necessary to insert intermediate periods $T_Z$ during a standby period $T_B$, in order to keep the fluid temperature constantly at the brewing water temperature of approx. 100° C.

As is evident from FIG. 7, rather at the beginning of each brewing process heating processes (heating intervals $T_H$) are provided in which a power of the fluid heating arrangement 50 is high in comparison to the conventional solution. This means it is possible to considerably reduce the heating-up period $T_H$ and therefore the waiting time at the beginning of a brewing process or for steam dispensation.

It should be noted at this point that the invention is not restricted to the embodiment shown. Adaptations and possible developments are known to the person skilled in the art.

That which is claimed:

1. A hot fluid preparation unit for a fully automatic coffee machine, comprising:
   a temperature control device;
   a fluid heating arrangement,
   a rectifier circuit; and
   a power semiconductor switching device,
   wherein the rectifier circuit is connected at an input of the rectifier circuit to an AC voltage supply and at an output of the rectifier circuit via the power semiconductor switching device to the fluid heating arrangement, wherein the power semiconductor switching device is designed to be controllable in such a manner that it selectively switches the output of the rectifier circuit through to the fluid heating arrangement, and wherein the temperature control device is designed to carry out a control of the power semiconductor switching device in a pulsed manner, in order thus to provide temperature control.

2. The hot fluid preparation unit according to claim 1, wherein the temperature control device is designed to vary the ratio of pulse duration to pulse interval of pulses provided for the control of the power semiconductor switching device.

3. The hot fluid preparation unit according to claim 1, wherein the fluid heating arrangement is designed, in accordance with the control of the power semiconductor switching device, to heat up drinking water supplied at an input of the fluid heating arrangement to a water temperature suitable for carrying out a coffee brewing process, or to heat up drinking water supplied at the input of the fluid heating arrangement to a useful steam temperature, and in each case to provide it at an output of the fluid heating arrangement.

4. The hot fluid preparation unit according to claim 3, wherein the fluid heating arrangement is designed to vary the ratio of pulse duration to pulse interval when heating the supplied drinking water, in order to regulate the thermal power of the fluid heating arrangement in a substantially continuous manner.

5. The hot fluid preparation unit according to claim 1, wherein the fluid heating arrangement is a thermoblock with a rated power of 2 kW, preferably of approximately 2.8 kW.

6. The hot fluid preparation unit according to claim 1, wherein the temperature control device is designed to adjust the ratio of pulse duration to pulse interval such that the fluid heating arrangement is operated in a medium power range, preferably approximately 1.4 kW if the target fluid temperature is about 100° C., and that the temperature control device is designed to adjust the ratio of pulse duration to pulse interval such that the fluid heating arrangement is operated in its rated power range, preferably approximately 2.8 kW, if the target fluid temperature lies in the steam range, advantageously in the region of approximately 160° C.

7. The hot fluid preparation unit according to claim 1, wherein the hot fluid preparation unit additionally comprises a temperature sensor for sensing the fluid temperature in the fluid heating arrangement or at the output thereof, and wherein the temperature control device is configured to vary the ratio of pulse duration to pulse interval such that a target fluid temperature which is, or is enabled to be, specified in advance is attained at the output of the fluid heating arrangement.

8. The hot fluid preparation unit according to claim 1, wherein the power semiconductor switching device is implemented as a MOSFET, preferably as a power MOSFET.

9. A fully automatic coffee machine including a hot fluid preparation unit according to claim 1, wherein the fully automatic coffee machine comprises a flow control device for driving an automatic or semi-automatic hot beverage preparation process, and wherein the flow control device is configured to assume the task of specifying the target fluid temperature for the temperature control device in accordance with a temporal sequence of the hot beverage preparation process.

10. The fully automatic coffee machine according to claim 9, wherein the temperature control device is configured to control the fluid heating arrangement during a standby period ($T_B$) of the fully automatic coffee machine in such a manner that its thermal power amounts to zero throughout.

11. A method for operating a fully automatic coffee machine, wherein to prepare a hot fluid the fully automatic coffee machine comprises at least one hot fluid preparation unit, which in turn comprises:
   a temperature control device;
   a fluid heating arrangement,
   a rectifier circuit; and
   a power semiconductor switching device,
   wherein the rectifier circuit is connected at an input of the rectifier circuit to an AC voltage supply and an output of the rectifier circuit via the power semiconductor switching device to the fluid heating arrangement, wherein the power semiconductor switching device is designed to be controllable in such a manner that it selectively switches the output of the rectifier circuit through to the fluid heating arrangement, and wherein the temperature control device is designed to carry out a control of the power semiconductor switching device in a pulsed manner, wherein the method comprises:
   determining a process-related parameter for a hot beverage preparation to be carried out;
   varying of the ratio of pulse duration to pulse interval of pulses provided for the control of the power semiconductor switching device in accordance with the process-related parameter, in order to adjust an associated thermal power ($P_{TH}$) of the fluid heating arrangement.

12. The method according to claim 11, wherein the process-related parameter specifies whether hot water or steam is to be dispensed and/or wherein the process-related parameter specifies at what temperature the hot water or the steam is to be dispensed.

13. The method according to claim 12, wherein the ratio of pulse duration to pulse interval is modified when dispensing hot water or steam, in order to vary the thermal power of the fluid heating arrangement in a substantially continuous manner.

14. The method according to claim 11, wherein the method additionally comprises:
   determining the fluid temperature that is to be provided at the output of the fluid heating arrangement,
   and wherein the process-related parameter specifies whether or not the fluid temperature falls below a process-related target fluid temperature for the hot beverage preparation to be carried out by more than a specified or specifiable value.

15. The method according to claim 11, wherein the temperature control device controls the fluid heating arrangement during a standby period ($T_B$) of the fully automatic coffee machine in such a manner that its thermal power amounts to zero throughout.

\* \* \* \* \*